United States Patent
Yiu

(10) Patent No.: US 11,991,571 B2
(45) Date of Patent: May 21, 2024

(54) CONDITIONAL HANDOVER IN WIRELESS NETWORKS

(71) Applicant: Apple Inc., Cupertino, CA (US)

(72) Inventor: Candy Yiu, Portland, OR (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 17/276,017

(22) PCT Filed: Sep. 11, 2019

(86) PCT No.: PCT/US2019/050622
§ 371 (c)(1),
(2) Date: Mar. 12, 2021

(87) PCT Pub. No.: WO2020/060822
PCT Pub. Date: Mar. 26, 2020

(65) Prior Publication Data
US 2022/0070746 A1    Mar. 3, 2022

Related U.S. Application Data

(60) Provisional application No. 62/733,820, filed on Sep. 20, 2018.

(51) Int. Cl.
*H04W 36/36* (2009.01)
*H04L 5/00* (2006.01)
(Continued)

(52) U.S. Cl.
CPC ..... *H04W 36/00837* (2018.08); *H04L 5/0053* (2013.01); *H04W 36/0058* (2018.08); *H04W 74/0841* (2013.01)

(58) Field of Classification Search
CPC ......... H04W 74/0841; H04W 36/0058; H04W 36/00837; H04W 36/36; H04W 74/006; H04L 5/0053
See application file for complete search history.

(56) References Cited

U.S. PATENT DOCUMENTS

2014/0126545 A1    5/2014   Tamura et al.
2017/0135001 A1*   5/2017   Kim ..................... H04L 5/0055
(Continued)

FOREIGN PATENT DOCUMENTS

CN      107079318       8/2017
WO    2018083649 A1     5/2018
(Continued)

OTHER PUBLICATIONS

International Search Report and Written Opinion for International Application No. PCT/US2019/050622, dated Jan. 17, 2020, 9 pgs.
(Continued)

*Primary Examiner* — Anez C Ebrahim
(74) *Attorney, Agent, or Firm* — Kowert, Hood, Munyon, Rankin & Goetzel, P.C.

(57) ABSTRACT

An apparatus of a user equipment (UE) includes processing circuitry, where to configure the UE for conditional handover between a source base station (SBS) and a target base station (TBS) in a wireless network, the processing circuitry is to decode measurement configuration information from the SBS. The measurement configuration information indicating a measurement event and a first threshold associated with the measurement event to trigger measurement reporting. A measurement report is encoded for transmission to the SBS, the measurement report triggered based on the first threshold. RRC signaling is received from the SBS. The RRC signaling includes a conditional handover command indicating a second threshold for the measurement event, the second threshold being higher than the first threshold. A handover from the SBS to the TBS is performed based on the conditional handover command after detecting that the measurement event satisfies the second threshold.

20 Claims, 7 Drawing Sheets

(51) Int. Cl.
    *H04W 36/00*    (2009.01)
    *H04W 74/0833*    (2024.01)

(56) References Cited

U.S. PATENT DOCUMENTS

| | | | |
|---|---|---|---|
| 2018/0220344 A1 | 8/2018 | Shaheen | |
| 2018/0227805 A1 | 8/2018 | Jang | |
| 2019/0223073 A1* | 7/2019 | Chen | H04W 36/0058 |
| 2022/0201561 A1* | 6/2022 | Bin Redhwan | H04W 36/0058 |

FOREIGN PATENT DOCUMENTS

| | | |
|---|---|---|
| WO | 2018132051 A1 | 7/2018 |
| WO | 2018175819 A1 | 9/2018 |

OTHER PUBLICATIONS

Samsung, 'Introduction of Conditional handover', R2-1802486, 3GPP TSG RAN WG2 #101, Athens, Greece, Feb. 14, 2018, 5 pgs.
LG Electronics Inc., 'Conditional handover procedure', R2-1802693, 3GPP TSG RAN WG2 #101, Athens, Greece, Feb. 14, 2018, 3 pgs.
Ericsson, 'Conditional Handover—simulation results', R2-1801330, 3GPP TSG RAN WG2 NR-AH1801, Vancouver, Canada, Jan. 12, 2018, 7 pgs.
Astri et al., 'Discussion on Conditional Handover in NR', R2-1802008, 3GPP TSG RAN WG2 #101, Athens, Greece, Feb. 12, 2018, 6 pgs.
International Preliminary Report on Patentability for International Application No. PCT/US2019/050622, dated Sep. 15, 2020, 5 pgs.
ERICSSON; "Conditional Handover"; 3GPP TSG-RAN WG2 #97; R2-1700864; Jan. 2017; Athens, Greece; 5 pgs.
Huawei, et al.; "Analysis on Conditional Handover"; 3GPP TSG-RAN WG2 #97bis; R2-1703384; Apr. 2017; Spokane, USA; 7 pgs.
Qualcomm Incorporated; "LTE Conditional HO Design Considerations"; 3GPP TSG-RAN WG2 Meeting #106; R2-1906375; May 2019; Reno, USA; 8 pgs.
Extended European Search Report; Application No. 19863145.9; dated May 16, 2022; 18 pgs.
Office Action for CN Patent Application No. 201980061015.X; dated Jan. 6, 2024.

\* cited by examiner

CONDITIONAL HANDOVER IN WIRELESS NETWORKS

PRIORITY CLAIM

This application is a U.S. National Stage filing of International Application No. PCT/US2019/050622, filed Sep. 11, 2019, titled "Conditional Handover in Wireless Networks", which claims the benefit of priority to the U.S. Provisional Application No. 62/733,820, filed Sep. 20, 2018, titled "CONDITIONAL HANDOVER". All of the aforementioned applications are incorporated herein by reference in their entireties.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for conditional handover in wireless networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for conditional handover in wireless networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
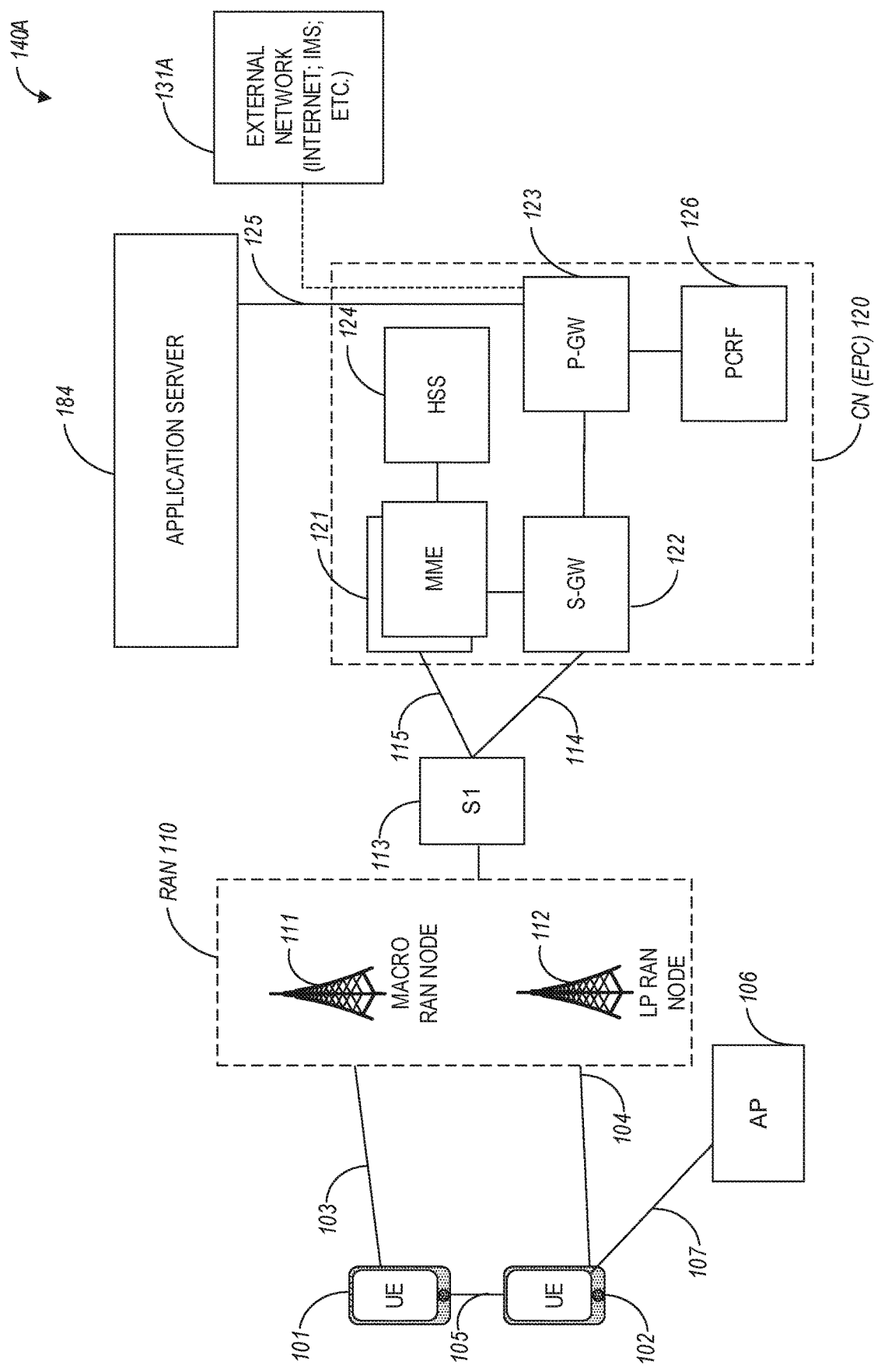
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1*i*). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
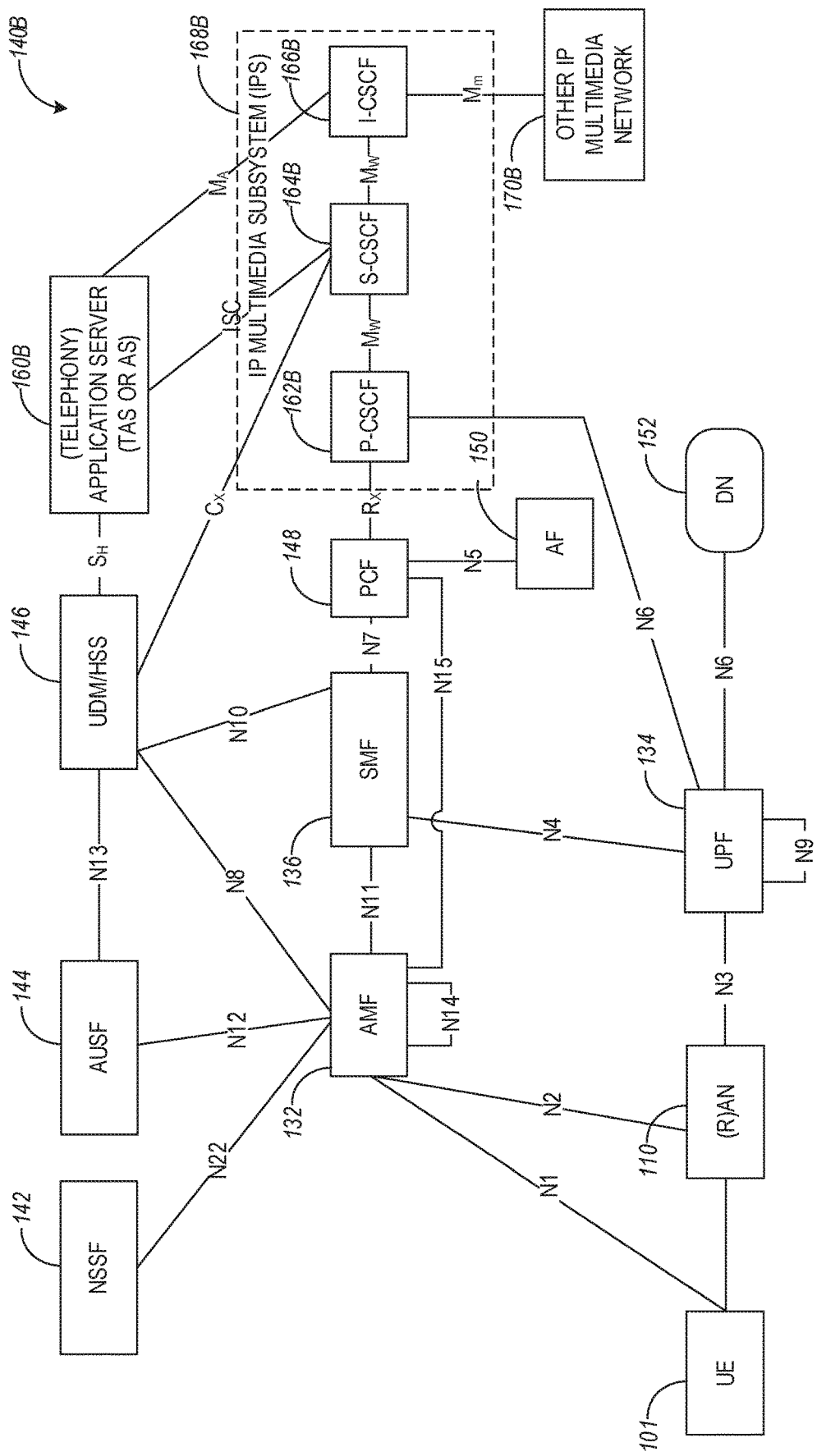
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
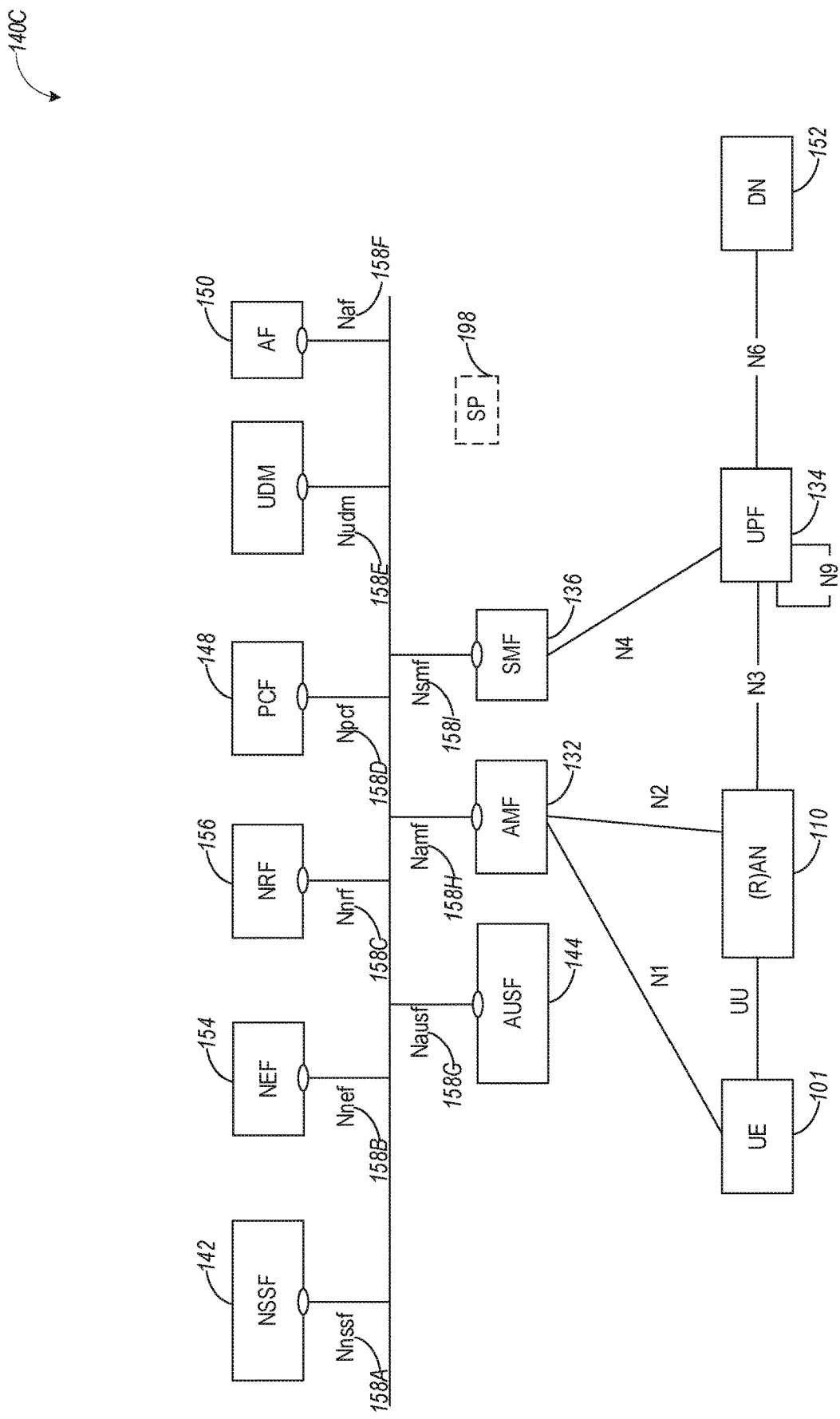

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques disclosed herein can be used to reduce user data interruption during handover (HO), which targets as close as possible to 0 ms (i.e., relaxed requirements could be considered) and improve robustness during handover.

Figure 2:
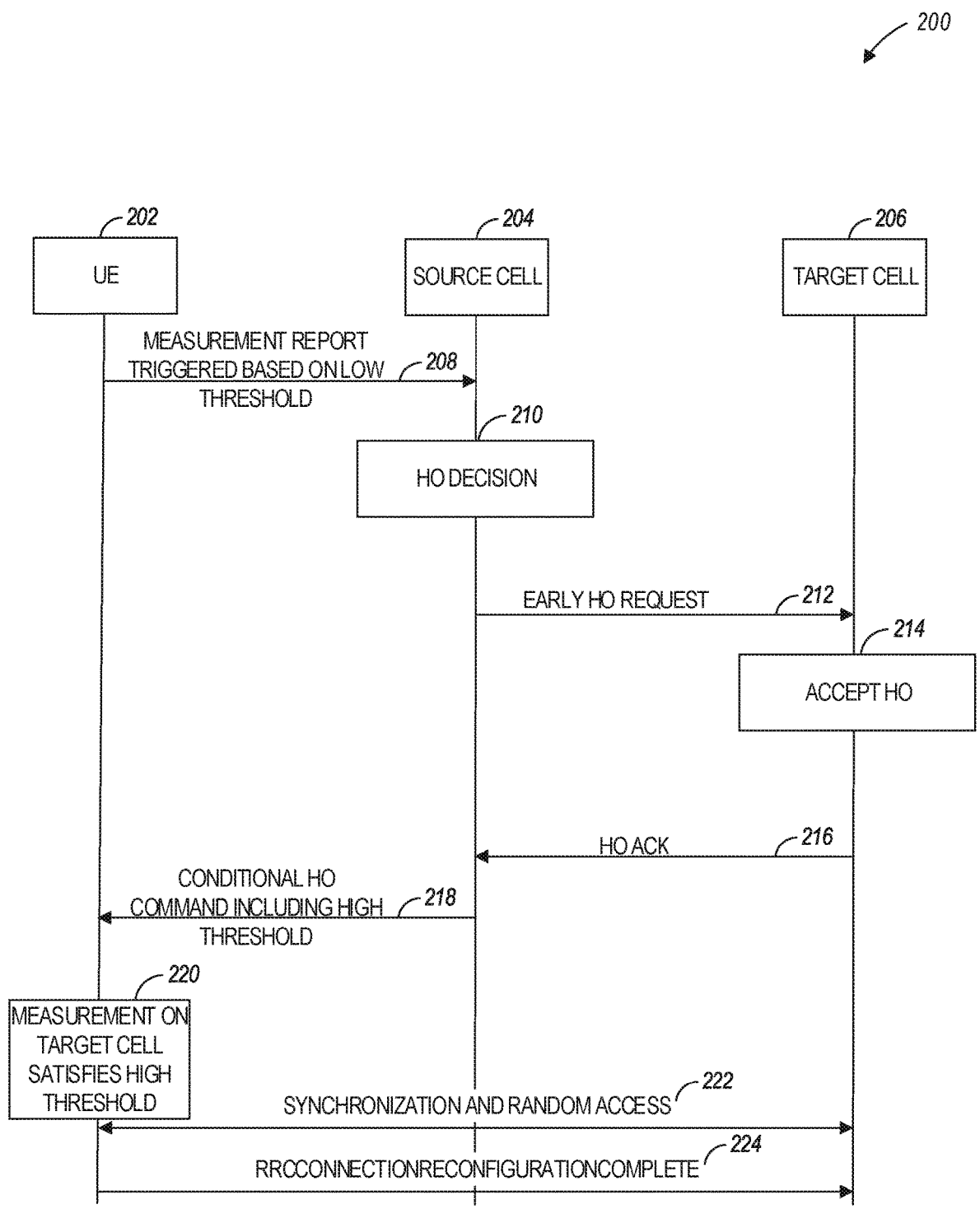
FIG. 2 illustrates a swimlane diagram of a conditional handover, in accordance with some aspects.

FIG. 2 illustrates a swimlane diagram 200 of a conditional handover, in accordance with some aspects. FIG. 2 shows the signaling flow of the basic conditional handover between a UE 202, a source cell 204, and a target cell 206. The key idea is to configure a "lower" threshold for one or more measurement events, to trigger early measurement report to the serving cell. Then the serving cell 204 will prepare the target cell and forward the handover command to the UE with a "higher" threshold for the measurement event to increase the reliability of the handover command. When the "higher" threshold condition is met, the UE will trigger handover (synchronization to the target cell and a random access procedure) to the target cell 206. One of the issues associated with handover failure (HOF) is the failure in delivery of the HO command. In conditional handover (e.g., as illustrated in FIG. 2), the measurement report is triggered based on a lower threshold, therefore, the HO command delivery will be more reliable.

Referring to FIG. 2, at operation 208, a measurement report is triggered based on a lower threshold for a measurement event. The measurement event, as well as the associated low threshold, can be configured prior to operation 208, by the source cell 204. At operation 210, the source cell 204 can make a handover decision based on the received measurement report. At operation 212, the source cell 204 communicates a handover request to the target cell 206. The handover request can include a request for conditional handover based on a higher threshold (i.e., a threshold that is higher than the low threshold configured for the measurement report in operation 208). At operation 214, the target cell 206 accepts the handover request. At operation 216, the target cell 206 communicates a handover acknowledgment to the source cell 204. The handover acknowledgment can include a conditional handover command including a high threshold for a measurement event (e.g., the measurement event used for triggering the measurement report in operation 208). At operation 218, the source cell 204 communicates a conditional handover command (e.g., the conditional handover command received with the handover acknowledgment at operation 216) together with the high threshold to the UE 202. At operation 220, the UE 202 performs a measurement on the target cell 206 which satisfies the high threshold communicated with the conditional handover command. At operation 222, synchronization and random access procedure can take place between the UE 202 and the target cell 206. At operation 224, the UE can communicate a handover completion message, such as RRC Connection Reconfiguration Complete message.

Figure 3:
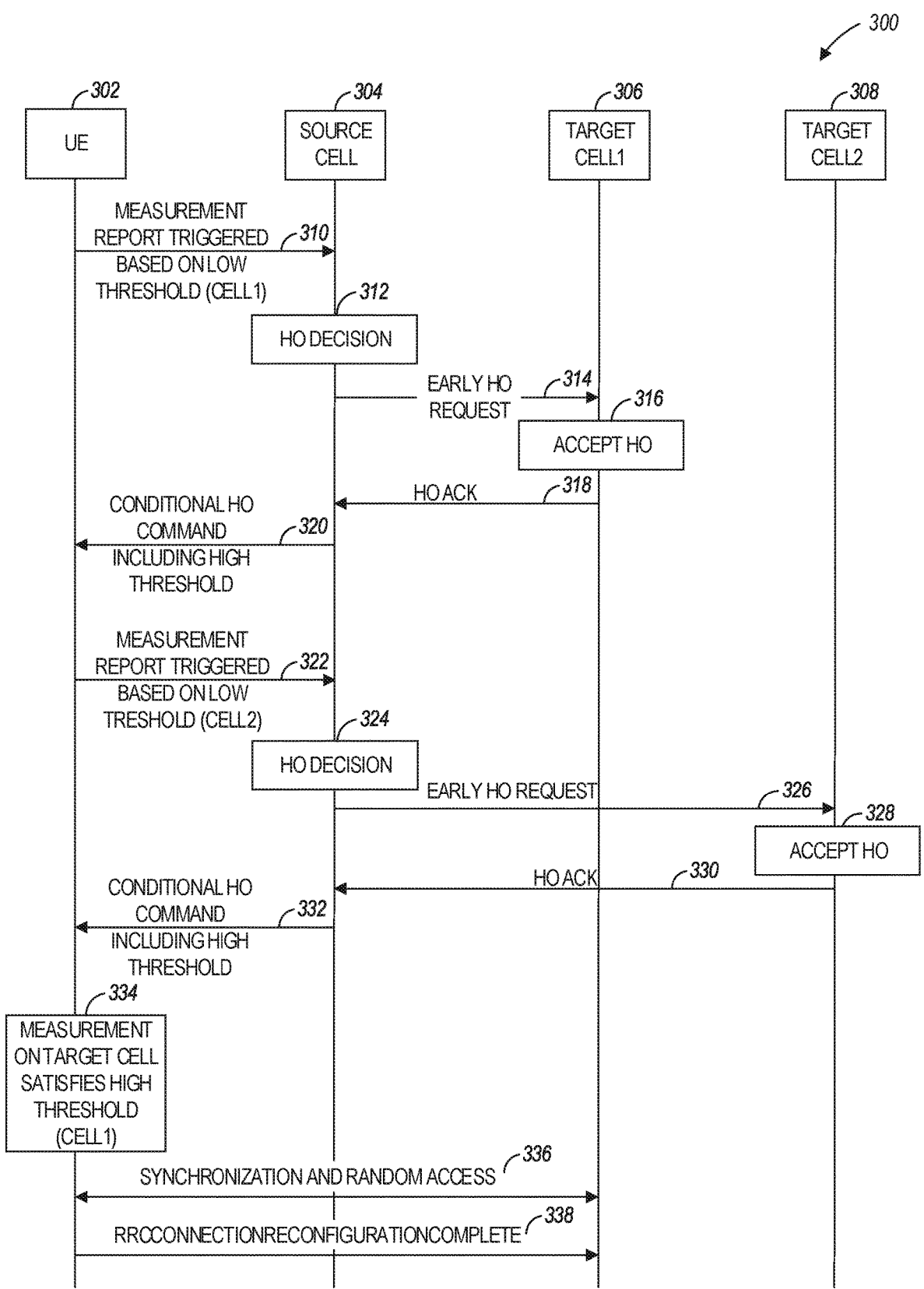
FIG. 3 illustrates a swimlane diagram of a conditional handover with more than one target cells, in accordance with some aspects.

Observation 1: Conditional handover may increase the reliability of HO command delivery by early event triggering. FIG. 2 illustrates a simpler case of conditional HO where there is only one target cell triggering the UE to send the measurement report, with the UE eventually triggering HO when the "higher" threshold is met. FIG. 3 illustrates a different communication environment where more than one target cells triggered the UE to send the measurement report.

FIG. 3 illustrates a swimlane diagram of a conditional handover with more than one target cells, in accordance with some aspects. FIG. 3 shows a communication sequence where multiple potential target cells were triggered by a "lower" threshold and hence measurement reports were sent by the UE. Multiple target cells preparation will be required along with multiple HO commands were sent to the UE. Therefore, more signaling overhead in conditional handover due to multiple measurement report, preparation, and HO commands may be used in connection with FIG. 3.

FIG. 3 shows conditional handover signaling flow 300 where multiple potential target cells (e.g., a first target cell 306 and a second target cell 308) may trigger the UE 302 to sends measurement reports to the source cell 304. In conditional handover, a "lower" threshold is configured to the UE to trigger early measurement reporting. After the serving cell 304 reserves the resource (e.g., prepares the target cell), the HO command will be sent to the UE 302 along with a "higher" threshold configuration for one or more measurement events (which may be configured together with the "lower" threshold). Multiple HO commands may be sent to the UE due to multiple potential target cell satisfying the "lower" threshold. This results in multiple target cells preparation and, therefore, more signaling overhead in the air interface and the X2 interface due to communication of multiple measurement reports, preparation, and HO commands.

Referring to FIG. 3, at operation 310, a measurement report (for the first target cell 306) is triggered based on a lower threshold for a measurement event. The measurement event, as well as the associated low threshold, can be configured prior to operation 310, by the source cell 304. More specifically, prior to operation 310, the network configures a low threshold in measurement configuration along with the measurement event to the UE. At operation 310, the UE sends the measurement report when the event is triggered. i.e. one or more cells satisfy the low threshold configuration.

At operation 312, the source cell 304 can make a handover decision for handover to the first target cell 306 based on the received measurement report at operation 310.

At operation 314, the source cell 304 communicates a handover request to the first target cell 306. The handover request can include a request for conditional handover based on a higher threshold (i.e., a threshold that is higher than the low threshold configured for the measurement report in operation 310). The serving cell 304 sends the early HO request to the target cell (e.g., 306) to reserve resource to the UE. This signaling may include a conditional HO request to check if the target cell supports conditional HO (this feature is currently not supported in legacy HO).

At operation 316, the first target cell 306 accepts the handover request.

At operation 318, the first target cell 306 communicates a handover acknowledgment to the source cell 304. The handover acknowledgment can include a conditional handover command including a high threshold for a measurement event (e.g., the measurement event used for triggering the measurement report in operation 310).

In some aspects, at operation 318, the target cell (e.g., 306) sends either a HO acknowledgment (ACK) or reject to the serving cell based on support of conditional HO. In case of HO ACK, signaling at operation 318 may include the following: a HO command including a RACH resource (contention-free RACH preamble); a timer to indicate how long the RACH resource can be valid; an offset to indicate when the UE may exit the conditional HO; a high threshold for the conditional handover to execute; and a time-to-trigger (TTT) parameter for this condition, where the measurement has to satisfy the high threshold for TTT amount of time.

At operation 320, the source cell 304 communicates a conditional handover command (e.g., the conditional handover command received from the first target cell 306 with the handover acknowledgment at operation 318 is forwarded) together with the high threshold to the UE 302.

Once the UE receives the conditional HO command at operation 320, the UE maintains a connection with the source/serving cell 304. If the high threshold is satisfied with the configured target cell, the UE disconnects with the serving cell and performs a RACH procedure to the target cell to complete the HO. If the timer expired in the HO command, the UE discards the HO command and the target cell releases the resources. If an exit condition is satisfied, the UE sends an exit indication to the serving cell for the configured target cell.

At operation 322, a measurement report (for the second target cell 308) is triggered based on a lower threshold for a measurement event. The measurement event, as well as the associated low threshold, can be configured prior to operation 322, by the source cell 304.

At operation 324, the source cell 304 can make a handover decision for handover to the second target cell 306 based on the received measurement report at operation 310.

At operation 326, the source cell 304 communicates a handover request to the second target cell 308. The handover request can include a request for conditional handover based on a higher threshold (i.e., a threshold that is higher than the low threshold configured for the measurement report in operation 322).

At operation 328, the second target cell 308 accepts the handover request.

At operation 330, the second target cell 308 communicates a handover acknowledgment to the source cell 304. The handover acknowledgment can include a conditional handover command including a high threshold for a measurement event (e.g., the measurement event used for triggering the measurement report in operation 322).

At operation 332, the source cell 304 communicates a conditional handover command (e.g., the conditional handover command received from the second target cell 306 with the handover acknowledgment at operation 330) together with the high threshold to the UE 302.

At operation 334, the UE 302 performs a measurement on one or more of the target cell and determines that measurement in a configured measurement event for the first target cell 306 satisfies the high threshold communicated with the conditional handover command (e.g., at operation 332).

At operation 336, synchronization and random access procedure can take place between the UE 302 and the first target cell 306. At operation 338, the UE 302 can communicate a handover completion message to the first target cell 306, such as an RRC Connection Reconfiguration Complete message.

After operation 338, the target cell 306 sends a HO complete message to the serving cell to indicate the HO is completed. The serving cell 304 sends resources release message to all other configured target cells so that they can release the resources they are holding for UE 302.

Observation 2: Conditional HO increases both the air interface and the X2 interface signaling (between the cells) overhead due to the communication of multiple measurement reports, preparation (HO request and ACK) messaging, and HO commands. Additionally, conditional handover can increase the reliability of HO command delivery by early event triggering, conditional handover may be associated with a longer handover duration than a legacy HO, and conditional handover may reduce HOF rate (e.g., by providing more reliable HO command delivery) in tradeoff of increasing air interface and X2 signaling overhead.

Additional aspects that may be considered in connection with techniques discussed herein include whether the target cell may configure a contention-based RACH procedure (CBRA), which may reduce the conservation of the resources to the UE. The following options may be used to configure such contention-based RACH procedure.

Option1: the target cell can configure only contention-free RACH procedure (CFRA) with no timer, which may be valid until UE handover success or other indication from the network.

Option2: the target cell can configure CFRA with a timer indicating how long it is valid, then the UE uses CBRA after that.

Option3: the target cell can configure CFRA with a timer; when the timer expires, the UE does not consider the target cell anymore, and the UE will not fall back to CBRA.

If the timer expired, the UE may exit conditional handover, or the UE may use contention-based RACH after the timer expired. In this case, the UE will only exit conditional handover based on the offset (exit condition).

In some aspects, multiple HO commands may be used based on the following options.

Option 1: the UE considers all HO commands sent to the UE. Option 2: the UE considers all HO commands sent to the UE with a timer, as long as the timer is valid. Option 3: the UE considers all HO commands until the target cell exits the measurement event. Option 4: the UE considers only the last HO command. Option 5: The network can indicate remove to a potential target cell in which the HO command has sent to the UE (release of HO command).

Figure 4:
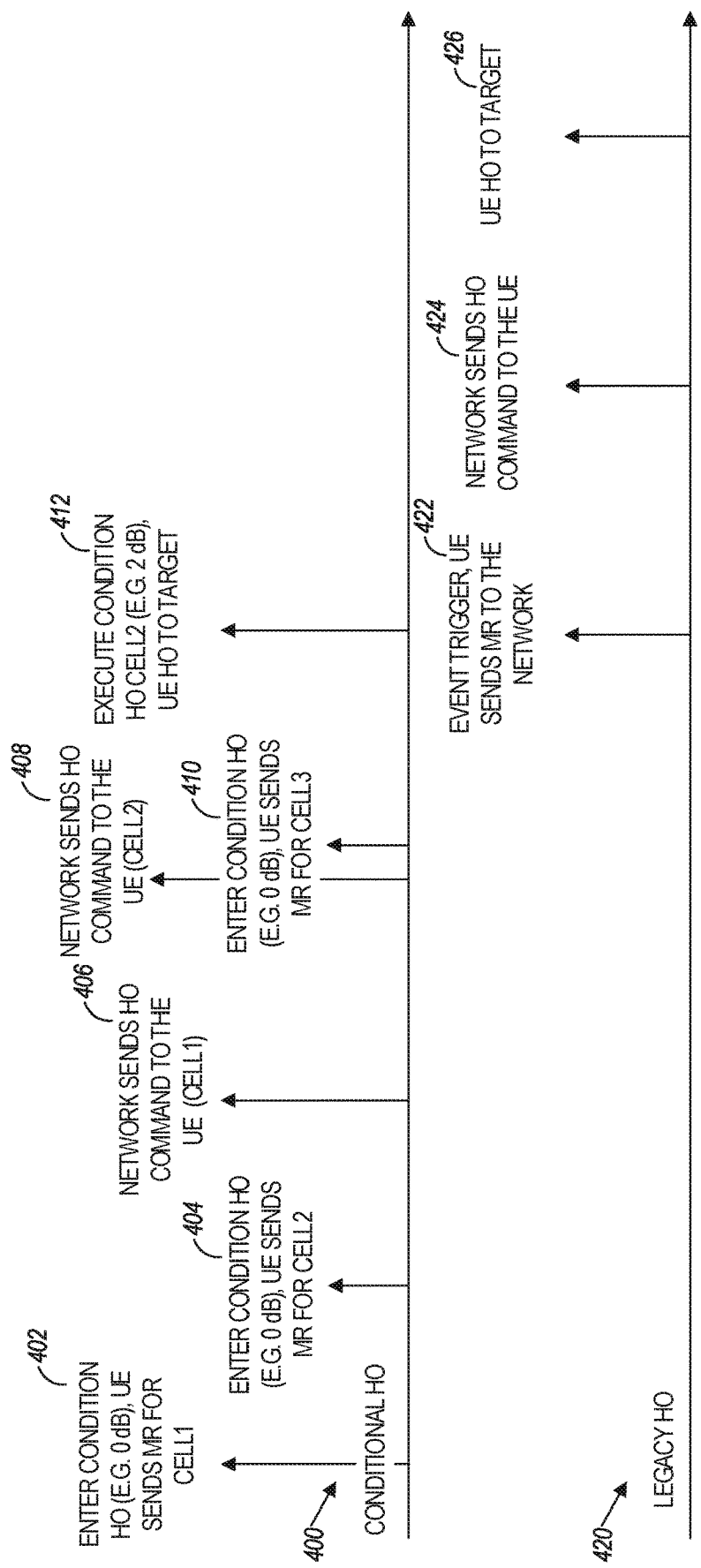
FIG. 4 illustrates events for conditional handover and legacy handover, in accordance with some aspects.

FIG. 4 illustrates events for conditional handover 400 and legacy handover 420 in a timeline, in accordance with some aspects. The conditional HO 400 may include the following operations: the UE sends a measurement report (MR) for cell 1 at operation 402; the UE sends an MR for cell 2 at operation 404; the network sends an HO command (for cell 1) to the UE at operation 406; the network sends an HO command (for cell 2) to the UE at operation 408; UE sends an MR for cell 3 at operation 410; the UE executes conditional HO to cell 2.

The legacy HO 420 may include the following operations: upon an event trigger, the UE sends an MR to the network at operation 422, the network sends a HO command to the UE at operation 424, and the UE performs the HO to the target at operation 426.

FIG. 4 shows that conditional handover triggers earlier measurement reporting by configuring a smaller offset/ threshold (e.g., configure A3 offset=0 dB instead of 2 dB). A higher threshold (e.g., 2 dB) can be used to trigger the UE-based conditional handover. Therefore, the duration of the HO cycle is longer in conditional HO than in the legacy HO.

Observation 3: Conditional HO tends to have a longer handover duration than legacy HO.

TABLE 1

Handover performance for conditional handover in compare to legacy handover

|  | Legacy HO | Conditional HO Trigger cond: 0 dB | Conditional HO Trigger cond: 1 dB |
| --- | --- | --- | --- |
| HOF rate | 22% | 17% | 18% |
| # MR | 713 | 2152 | 1328 |
| # HO command | 713 | 2152 | 1328 |
| # X2 signaling | 1426 | 4304 | 2656 |
| Time from first HO command to HOS | 40 ms | 98 ms | 97 ms |

Table 1 above shows the simulation performance result for conditional handover with different parameters setting we discussed above. The simulation results show the handover failure (HOF) rate is improved in conditional HO due to more reliable delivery of the HO command. However, conditional HO has more than double signaling overhead in measurement reporting and HO command. Similarly, X2 signaling exchange is also doubled. By increasing the triggering condition from 0 dB to 1 dB, the signaling overhead is reduced. This implies the signaling overhead is due to too early triggering but in a trade-off of a slight increase in the HOF rate.

Observation 4: Conditional HO reduces HOF rate in a trade-off of air interface and X2 signaling overhead.

Figure 5:
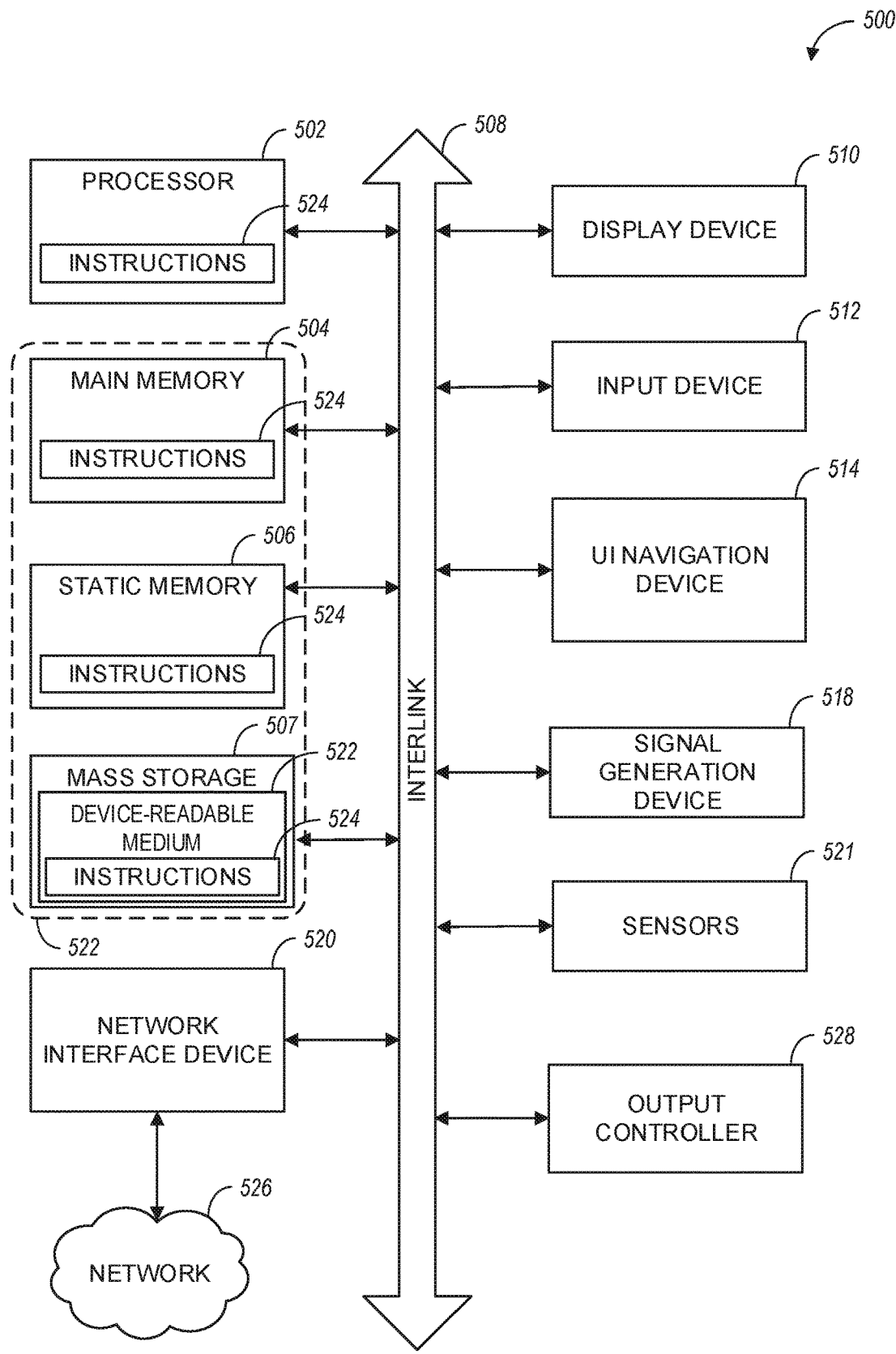
FIG. 5 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 5 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 500 may operate as a standalone device or may be connected (e.g., networked) to other communication devices.

Circuitry (e.g., processing circuitry) is a collection of circuits implemented in tangible entities of the device 500 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 500 follow.

In some aspects, the device 500 may operate as a standalone device or may be connected (e.g., networked) to other devices. In a networked deployment, the communication device 500 may operate in the capacity of a server communication device, a client communication device, or both in server-client network environments. In an example, the communication device 500 may act as a peer communication device in peer-to-peer (P2P) (or other distributed) network environment. The communication device 500 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 500 may include a hardware processor 502 (e.g., a central processing unit (CPU), a graphics processing unit (GPU), a hardware processor core, or any combination thereof), a main memory 504, a static memory 506, and mass storage 507 (e.g., hard drive, tape drive, flash storage, or other block or storage devices), some or all of which may communicate with each other via an interlink (e.g., bus) 508.

The communication device 500 may further include a display device 510, an alphanumeric input device 512 (e.g., a keyboard), and a user interface (UI) navigation device 514 (e.g., a mouse). In an example, the display device 510, input device 512 and UI navigation device 514 may be a touch-screen display. The communication device 500 may additionally include a signal generation device 518 (e.g., a speaker), a network interface device 520, and one or more sensors 521, such as a global positioning system (GPS) sensor, compass, accelerometer, or another sensor. The communication device 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 507 may include a communication device-readable medium 522, on which is stored one or more sets of data structures or instructions 524 (e.g., software) embodying or utilized by any one or more of the techniques or functions described herein. In some aspects, registers of the processor 502, the main memory 504, the static memory 506, and/or the mass storage 507 may be, or include (completely or at least partially), the device-readable medium 522, on which is stored the one or more sets of data structures or instructions 524, embodying or utilized by any one or more of the techniques or functions described herein. In an example, one or any combination of the hardware processor 502, the main memory 504, the static memory 506, or the mass storage 516 may constitute the device-readable medium 522.

As used herein, the term "device-readable medium" is interchangeable with "computer-readable medium" or "machine-readable medium". While the communication device-readable medium 522 is illustrated as a single medium, the term "communication device-readable medium" may include a single medium or multiple media (e.g., a centralized or distributed database, and/or associated caches and servers) configured to store the one or more instructions 524. The term "communication device-readable medium" is inclusive of the terms "machine-readable medium" or "computer-readable medium", and may include any medium that is capable of storing, encoding, or carrying instructions (e.g., instructions 524) for execution by the communication device 500 and that cause the communication device 500 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 524 may further be transmitted or received over a communications network 526 using a transmission medium via the network interface device 520 utilizing any one of a number of transfer protocols. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input-multiple-output (SIMO), MIMO, or multiple-input-single-output (MISO) techniques. In some examples, the network interface device 520 may wirelessly communicate using Multiple User MIMO techniques.

The term "transmission medium" shall be taken to include any intangible medium that is capable of storing, encoding or carrying instructions for execution by the communication device 500, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. A method, comprising:
   at a user equipment device (UE), in association with a conditional handover between a source base station (SBS) and a target base station (TBS) in a wireless network:
   receiving, from the SBS, measurement configuration information, the measurement configuration information indicating a first threshold associated with a measurement event related to the TBS, wherein the first threshold is for triggering measurement reporting;
   comparing a measurement associated with the measurement event to the first threshold;
   in response to the comparison, transmitting, to the SBS, a measurement report; and
   receiving, from the SBS, radio resource control (RRC) signaling, the RRC signaling including a conditional handover command for handover from the SBS to the TBS, the conditional handover command associated with a second threshold for the measurement event, wherein the conditional handover command is based on a handover acknowledgement from the TBS responsive to a conditional handover request form the SBS to the TBS, wherein the RRC signaling further includes an offset for exiting the conditional handover.

2. The method of claim 1, wherein the conditional handover command originates from the TBS.

3. The method of claim 1, wherein the conditional handover command includes a random access channel (RACH) resource.

4. The method of claim 3, further comprising:
performing a RACH procedure with the TBS during the handover, using the RACH resource.

5. The method of claim 3, wherein the RRC signaling further includes a timer to indicate how long the RACH resource is valid.

6. The method of claim 1,
wherein, in response to a non-conditional handover command, an RRC connection is terminated between the UE and the SBS, and
wherein, in response to the conditional handover command, an RRC connection between the UE and the SBS is not terminated until after the second threshold is satisfied by the measurement event.

7. A method, comprising:
at a source base station (SBS), in order to configure the SBS for conditional handover between the SBS and a target base station (TBS) in a wireless network:
encoding measurement configuration information for transmission to a user equipment (UE), the measurement configuration information indicating a first threshold associated with a measurement event related to the TBS, wherein the first threshold is for triggering measurement reporting;
decoding a measurement report from the UE, the measurement report triggered based on the first threshold associated with the measurement event;
encoding a handover request for transmission to the TBS including a conditional handover request;
decoding a handover acknowledgement from the TBS, the handover acknowledgement received in response to the handover request and including a conditional handover command for transmission to the UE; and
encoding radio resource control (RRC) signaling for transmission to the UE, the RRC signaling including the conditional handover command for handover from the SBS to the TBS, the conditional handover command associated with a second threshold for the measurement event, wherein the RRC signaling further includes an offset for exiting the conditional handover.

8. The method of claim 7, further comprising:
encoding a handover request for transmission to the TBS.

9. The method of claim 8, further comprising:
decoding a handover acknowledgement from the TBS, the handover acknowledgement received in response to the handover request and including the conditional handover command for transmission to the UE.

10. The method of claim 9, wherein the handover acknowledgement further includes:
a random access channel (RACH) resource for use by the UE for a RACH procedure, and
an indication of how long the RACH resource will be available.

11. The method of claim 8, further comprising:
decoding a handover completion message from the TBS, wherein the handover completion message indicates completion of the conditional handover; and
encoding a resource release message for transmission to at least a second target base station for releasing of resources reserved for handover with the UE.

12. The method of claim 7, wherein the measurement report from the UE includes measurements triggered based on the first threshold and associated with the target base station and at least a second target base station, further comprising:
encoding a second handover request for transmission to the second target base station, wherein the handover acknowledgement is further received in response to the second handover request and including a second conditional handover command from the second target base station for transmission to the UE.

13. The method of claim 7, wherein the handover acknowledgement further includes
the second threshold for the measurement event.

14. A method, comprising:
at a target base station (TBS), in association with a conditional handover of a user equipment (UE) between a source base station (SBS) and the TBS in a wireless network:
receiving, from the SBS, an early handover request; and
transmitting, to the SBS, a handover acknowledgement, the handover acknowledgement comprising:
a conditional handover command for handover from the SBS to the TBS; and
a timer for a period of contention-free random access channel (RACH) procedure (CFRA), wherein a contention-based RACH procedure (CBRA) is to be used for the conditional handover after expiration of the timer.

15. The method of claim 14, wherein the conditional handover command originates from the TBS.

16. The method of claim 14, wherein the conditional handover command includes a random access channel (RACH) resource.

17. The method of claim 16, further comprising:
performing a RACH procedure with the UE during the handover, using the RACH resource.

18. The method of claim 14, further comprising:
transmitting, to the SBS, a handover completion message, wherein the handover completion message indicates completion of the conditional handover.

19. The method of claim 14, further comprising:
determining to accept the early handover request.

20. The method of claim 14, wherein the handover acknowledgement further includes a threshold for a measurement event.

* * * * *